United States Patent
Burton, III et al.

(10) Patent No.: US 7,710,993 B1
(45) Date of Patent: May 4, 2010

(54) PSEUDO WIRE PROCESSING IN A PACKET FORWARDING DEVICE

(75) Inventors: Charles Frederick Burton, III, Cary, NC (US); Tulasi S. Veguru, Sunnyvale, CA (US); Meera Siva Kasinathan, Bangalore (IN)

(73) Assignee: Extreme Networks, Inc., Santa Clara, CA (US)

( * ) Notice: Subject to any disclaimer, the term of this patent is extended or adjusted under 35 U.S.C. 154(b) by 210 days.

(21) Appl. No.: 11/933,032

(22) Filed: Oct. 31, 2007

(51) Int. Cl.
*H04L 12/28* (2006.01)
*H04L 12/56* (2006.01)
*H04J 3/16* (2006.01)
*H04J 3/22* (2006.01)
*G06F 15/173* (2006.01)

(52) U.S. Cl. .................. 370/419; 370/399; 370/395.53; 370/469; 709/238

(58) Field of Classification Search .................. 370/419, 370/399, 395.53, 469; 709/238
See application file for complete search history.

(56) References Cited

U.S. PATENT DOCUMENTS

| | | | |
|---|---|---|---|
| 2004/0141506 A1* | 7/2004 | Kim | 370/395.31 |
| 2005/0147114 A1* | 7/2005 | Stewart et al. | 370/432 |
| 2005/0226253 A1* | 10/2005 | Parker et al. | 370/395.42 |
| 2006/0007859 A1* | 1/2006 | Kadambi et al. | 370/229 |
| 2006/0098660 A1* | 5/2006 | Pal et al. | 370/395.51 |

* cited by examiner

*Primary Examiner*—Ayaz R Sheikh
*Assistant Examiner*—Tarell Hampton
(74) *Attorney, Agent, or Firm*—Blakely Sokoloff Taylor & Zafman

(57) ABSTRACT

A method is provided for pseudo wire processing in a packet forwarding device in which a packet is processed based on whether the ports through which the packet is transmitted are real or pseudo wire ports. The inbound and outbound port information is encoded using a predefined range of index values such that index values falling within one range of values are used for passing real port information, and index values falling within another range of values are used for passing pseudo wire port information. The index values are used in a manner that facilitates efficient performance of pseudowire processing for the packets in the switch fabric component of the packet forwarding device.

5 Claims, 13 Drawing Sheets

*100 – PSEUDOWIRE PROCESSING OVERVIEW*

PSEUDO WIRE PROCESSING IN A PACKET FORWARDING DEVICE

FIELD OF THE INVENTION

The present invention relates to the field of computer networks and internetworking communications technologies. In particular, the present invention relates to processing packets in a network supporting pseudo wires.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2007, Extreme Networks, Inc., All Rights Reserved.

BACKGROUND AND RELATED ART

A switch is a packet-forwarding device, such as a bridge (layer 2 switch) or a router (layer 3 switch), that determines the destination of individual data packets (such as Ethernet frames) and selectively forwards them across a packet switched network (such as an IP or MPLS packet switched network) according to the best route to their destination. The best route is associated with one of a number of ports on the packet-forwarding device, which are the device's external interface to the network.

In a network that supports pseudo wire emulation, the ports on the packet-forwarding device may include both real ports and pseudo wire ports. Pseudo wires are used to emulate native wire-line services, such as Ethernet, over a packet switched network (see, Pseudo Wire Emulation Edge-to-Edge (PWE3) Architecture, RFC 3985, March 2005). In general, a real port refers to a physical port on the packet-forwarding device through which packets may be transmitted, such as an Ethernet port. A pseudo wire port refers to a virtual port associated with one or more pseudo wires through which packets may be transmitted.

Packets transmitted to and from a packet-forwarding device through a pseudo wire port generally travel through a tunnel across the packet-switched network; the packet-forwarding device itself may be unaware whether the packets transmitted through its ports are transmitted using real ports or pseudo wire ports.

In today's packet-forwarding devices, much of the packet forwarding is performed in the switch fabric. The switch fabric is a hardware component of the packet-forwarding device, and thus provides high-speed forwarding performance. The packets transmitted through the pseudo wire ports, however, typically require additional pseudo wire processing to provide proper forwarding, not all of which is capable of being performed in the switch fabric of a typical packet forwarding device. For example, the pseudo wire traffic may require special echo kill or load balancing processing. As a result, the additional pseudo wire processing is typically performed in software rather than in the switch fabric, which can impair the efficiency of the forwarding function of the packet forwarding device, especially when handling large volumes of packets transmitted through pseudo wire ports.

SUMMARY

According to one aspect of the invention, a method and system is provided for pseudo wire processing in a packet forwarding device in which a packet is processed based on whether the ports through which the packet is transmitted are real or pseudo wire ports. The pseudo wire processing is performed in a manner that facilitates carrying out all or part of the processing in the switch fabric component of the packet forwarding device.

According to one aspect of the invention, a packet processing component of a packet forwarding device determines whether an inbound packet has been transmitted through a real port or a pseudo wire port. The packet processing component further determines whether an outbound packet will be transmitted through a real port or a pseudo wire port.

According to one aspect of the invention, the packet processing component passes the inbound and outbound port information to a switch fabric component of the packet forwarding device using index values, referred to in this application as abstract port indexes (API) when referring to inbound, or ingress, port information, and port tag indexes (PTI) when referring to outbound, or egress, port information.

According to one aspect of the invention, the range of values used for passing the inbound port information span predefined ranges such that index values falling within one range of values are used for passing real port information, and index values falling within another range of values are used for passing pseudo wire port information.

According to one aspect of the invention, the range of values used for passing the inbound port information are further subdivided into predefined ranges including a core pseudo wire range and a spoke pseudo wire range that indicate whether the inbound packet has been transmitted through a core or spoke pseudo wire port.

According to one aspect of the invention, the range of values used for passing the outbound port information also span predefined ranges, but rather than passing real and pseudo wire port information, the predefined ranges are used for passing multicast and unicast information such that index values falling with one range of values are used for indicating that an outbound packet requires multicast processing, and index values falling with another range of values are used for indicating that an outbound packet requires unicast processing.

According to one aspect of the invention, the switch fabric component of the packet forwarding device comprises, among other components, and output tag processor component that uses the index values containing the inbound and outbound port information, i.e., the API and PTI, to determine how to process the outbound packet.

According to one aspect of the invention, the output tag processor component uses the outbound port information, i.e., the PTI, to determine a new index value, referred to in this application as an output tag index (OTI), that indicates whether the outbound packet should be transmitted through a pseudo wire port or a real port.

According to one aspect of the invention, for packets requiring multicast processing, the output tag processor uses the PTI as an index to a multicast list having entries that are used to determine multiple ones of the new OTI values. For example, the output tag processor uses the PTI as an index to access the first entry in the multicast list, and pointers contained in the entries are used to access subsequent entries until the list is exhausted. Each entry is used to determine one of the new OTI values.

According to one aspect of the invention, the new OTI values span a predefined range such that index values falling within one range of values are used to specify real port information, and index values falling within another range of values are used to specify pseudo wire port information.

According to one aspect of the invention, the OTI values may be used as an index to an entry in the output tag memory portion of the switch fabric to look up the outbound port number when the OTI value falls within the range used to specify real port information. Otherwise, the OTI value is used to compute the outbound; pseudo wire information.

According to one aspect of the invention, the output tag processor initiates echo kill processing for outbound packets when both the inbound port information, API, and the outbound port information, OTI, indicate that the packet is transmitted homogeneously through the same type of port, i.e., real to real or pseudo wire to pseudo wire. Echo kill processing need not be initiated for packets transmitted heterogeneously through different types of ports, i.e., real to pseudo wire, or pseudo wire to real.

According to one aspect of the invention, packets transmitted homogenously through pseudo wire ports are echo killed when both the ingress and egress pseudo wire ports are identical, as well as when they are not identical but both fall within the core pseudo wire range. However, packets transmitted homogeneously through real ports are echo killed only when both the ingress and egress real ports are identical.

According to one aspect of the invention, for outbound packets that have not been echo killed, the output tag processor determines the final outbound port based on load balancing, including a load balancing hash value, an ingress offset, a round robin scheme or the like.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and apparatus for a pseudowire processing in a packet forwarding device, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a router, bridge, server or gateway, or as a software routine, hardware circuit, firmware, or a combination thereof.

Parts of the description will be presented using terminology commonly employed by those skilled in the art to convey the substance of their work to others skilled in the art, including terms of operations performed by a computer system or a packet-forwarding device, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

Figure 1:
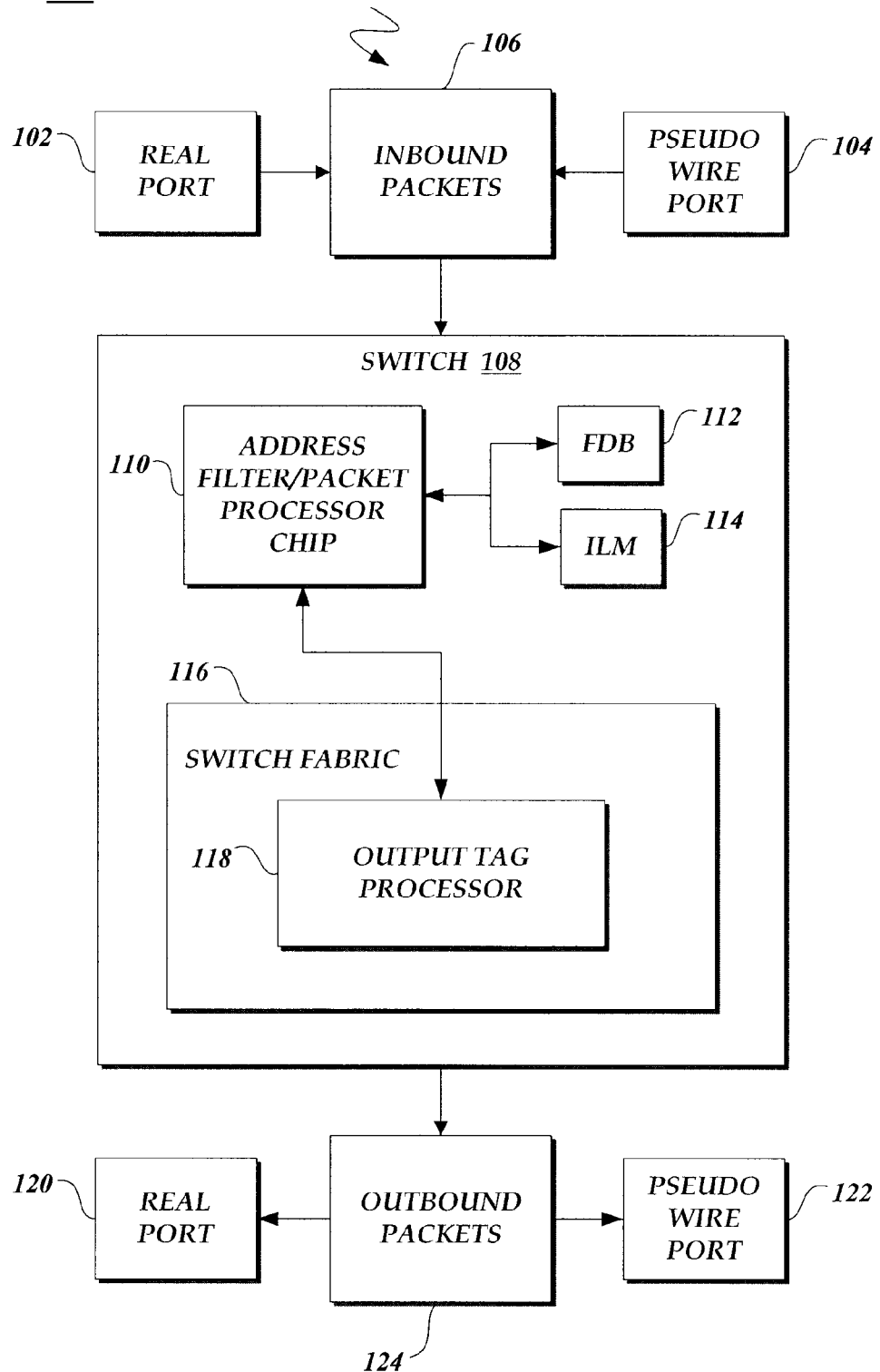
FIG. 1 is a block diagram illustrating certain aspects of pseudo wire processing in a packet-forwarding device in accordance with an embodiment of the invention.

FIG. 1 is a block diagram illustrating certain aspects of pseudo wire processing in a packet-forwarding device in accordance with an embodiment of the invention. As illustrated, inbound packets to a packet forwarding device such as switch 108 may be transmitted over a real port 102 or a pseudowire port 104. The packets may be transmitted using a forwarding protocol such as the Internet Protocol (IP) or the MultiProtocol Label Switching (MPLS). An address filter/packet processor chip 110 in the switch 108 operates in conjunction with a forwarding data base (FDB) 112 and/or an inbound label map (ILM) 114 to determine whether the inbound packet was transmitted through one of the real ports 102 or the pseudowire ports 104, and likewise, to further determine whether the outbound packet is to be transmitted through one of the real ports 102 or the pseudowire ports 104. The address filter/packet processor chip 110 encodes this port information into indexes that are made available to an output tag processor 118 in the switch fabric 116 component of the switch 108. The output tag processor 118 is then able to access the indexes to perform pseudowire processing on the packets based on the encoded port information. Upon completing the pseudowire processing, the switch 108 subsequently transmits the packets as outbound packets 124 through their designated outbound real port 120 or pseudo wire port 122, as appropriate.

Figure 2A:
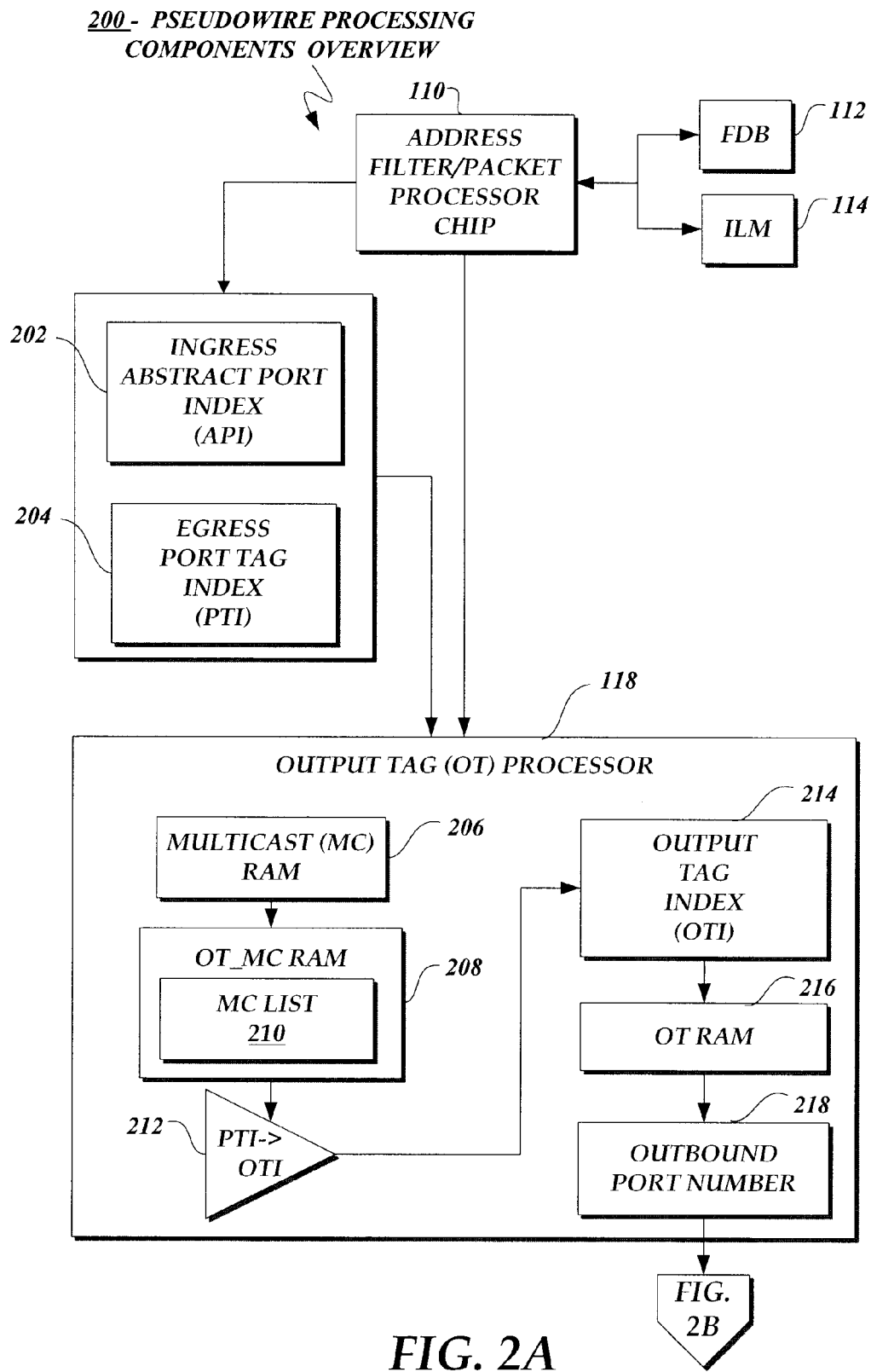
FIG. 2A-2B are block diagrams illustrating in further detail certain other aspects of pseudo wire processing in a packet-forwarding device in accordance with an embodiment of the invention.
Figure 2B:
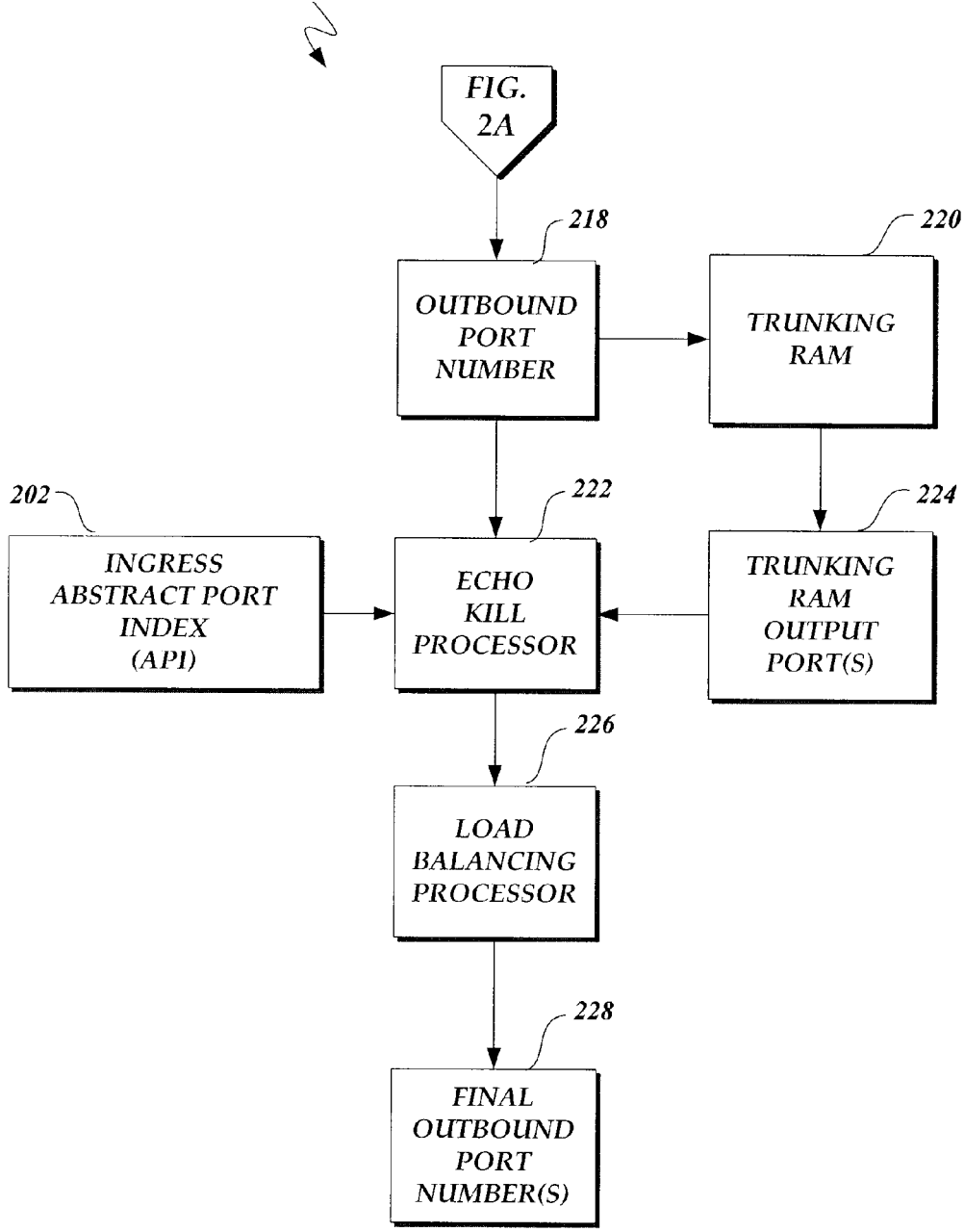

FIGS. 2A-2B are block diagrams illustrating in further detail certain other aspects of pseudo wire processing in a packet-forwarding device in accordance with an embodiment of the invention. As noted with reference to FIG. 1, the address filter/packet processor chip 110 operates in conjunction with the FDB 112 and/or the ILM 114 to determine whether the inbound packet was transmitted through one of the real ports 102 or the pseudowire ports 104, and likewise, to further determine whether the outbound packet is to be transmitted through one of the real ports 102 or the pseudowire ports 104. The address filter/packet processor chip 110 encodes this port information into indexes that are made available to an output tag processor 118 in the switch fabric 116 component of the switch 108. The indexes include an ingress abstract port index (API) 202 in which to encode the inbound port information, and an egress port tag index (PTI) 204 in which to encode the outbound port information. In a typical embodiment, the API 202 and PTI 204 index values span a predefined range of values such that index values falling within one range of values are used for representing real port information, and index values falling within another range of values are used for representing pseudowire port information. In one embodiment, the index values are encoded as a bit field that is large enough to accommodate 256K values. The range of values may be further subdivided such that one portion of the range is reserved for packets requiring unicast processing, and another portion of the range is reserved for packets requiring multicast processing.

In one embodiment, the output tag (OT) processor 118 may be comprised of several sub-components, including a multicast (MC) random access memory (RAM) component 206, an OT MC RAM component 208 in which a MC list 210 is stored containing entries for packets requiring multicast processing. The output tag processor 118 further comprises logic for mapping a given PTI to an output tag index (OTI) 214. The OTI 214 is yet another index value that is used to access entries stored in another component of the OT processor 118, the OT RAM 216. The entries of the OT RAM 216 may be used to obtain the outbound port number 218 that is to be used when transmitting the outbound packet to an outbound port.

Continuing in FIG. 2B, the outbound port number 218 is used to access the trunking RAM 220 to obtain the port numbers of an aggregated port 224. This information is used along with the ingress API 202 representing the inbound port through which the inbound packet was transmitted to perform echo kill processing. The echo kill processor 222 performs echo kill processing on packets that are being transmitted homogeneously through the same type of port, i.e., real to real or pseudowire to pseudowire. In a typical embodiment, the echo kill processing for real ports is performed differently that for pseudowire ports as will be described in further detail with reference to FIGS. 7-8.

For packets that have not been echo killed, or that do not require echo kill processing, the output tag processor 118 further includes a load balancing processor component 226 to determine the final outbound port number 228 to be used when subsequently transmitting the outbound packet through the outbound port.

Figure 3:
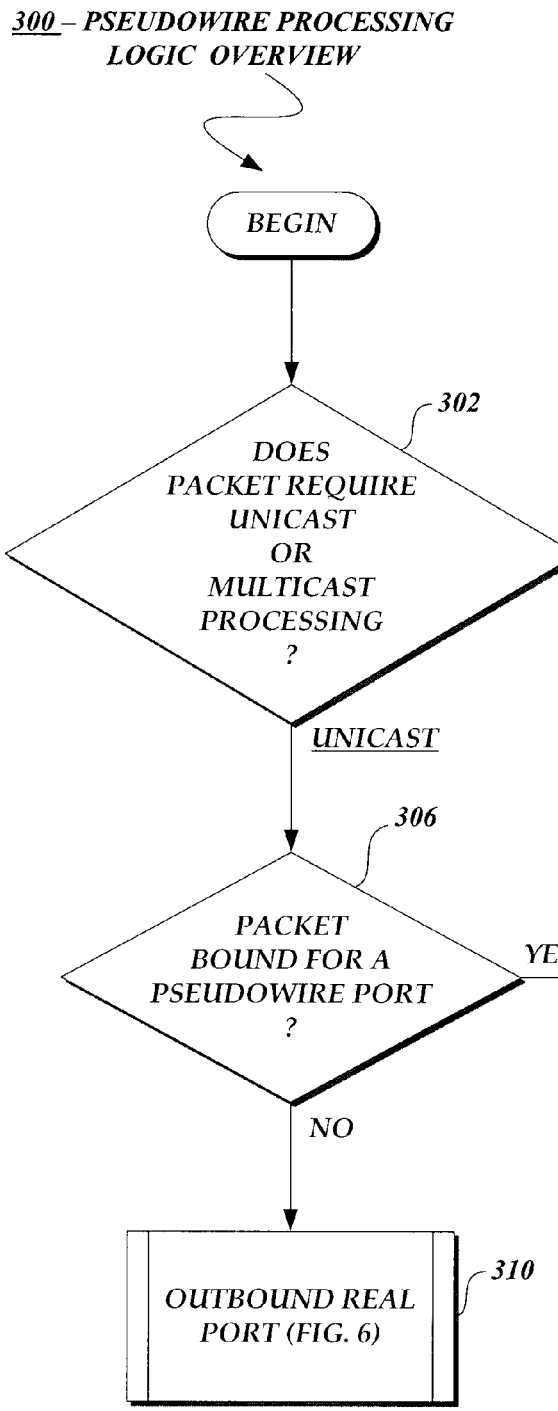
FIGS. 3-8 are flow diagrams illustrating certain aspects of a method to be performed by a packet-forwarding device incorporating pseudowire processing in accordance with an embodiment of the invention.

FIGS. 3-8 are flow diagrams illustrating certain aspects of a method to be performed by a packet-forwarding device incorporating pseudowire processing in accordance with an embodiment of the invention. FIG. 3 illustrates an overview of the logic performed within a packet forwarding device to support pseudowire processing. At decision block 302 a method 300 determines whether the packet requires unicast or multicast processing based on the PTI index value passed from the address filter/packet processing chip, where the PTI is an index value that represents the egress port information. As noted earlier, a portion of the range of the PTI index values is reserved for packets requiring unicast processing and packets requiring multicast processing. Therefore the method 300 performs the decision block 302 based on where in the range of values the PTI falls. The PTI index value for packets requiring unicast processing is further interrogated at decision block 306 to determine the port information, i.e., whether the packet is bound for a pseudowire port or a real port. Outbound pseudowire process 308 is described in further detail in FIG. 5 and outbound real port process 310 is described in further detail in FIG. 6. The processing of packets requiring multicast processing is further described at 304 in FIG. 4.

Figure 4A:
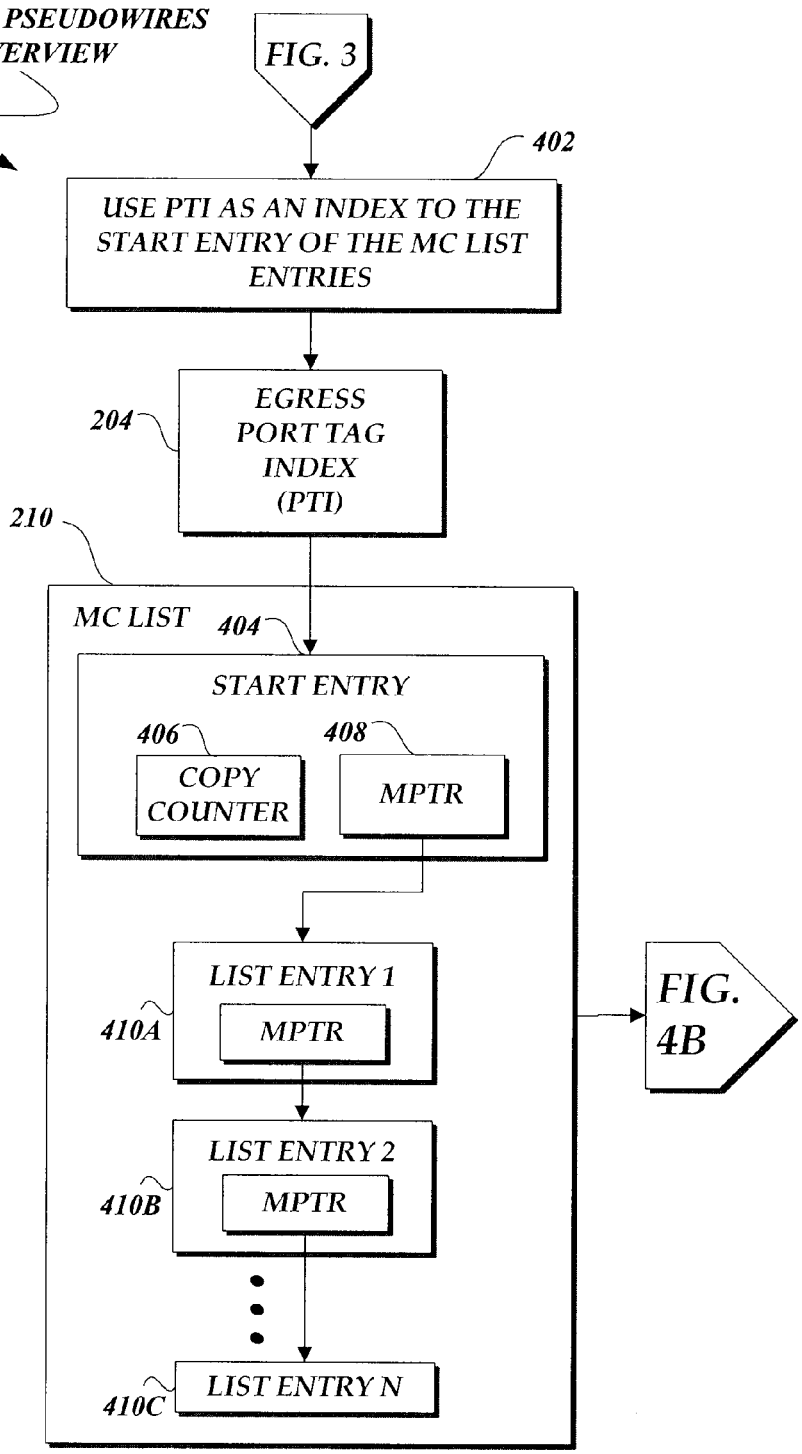
Figure 4B:
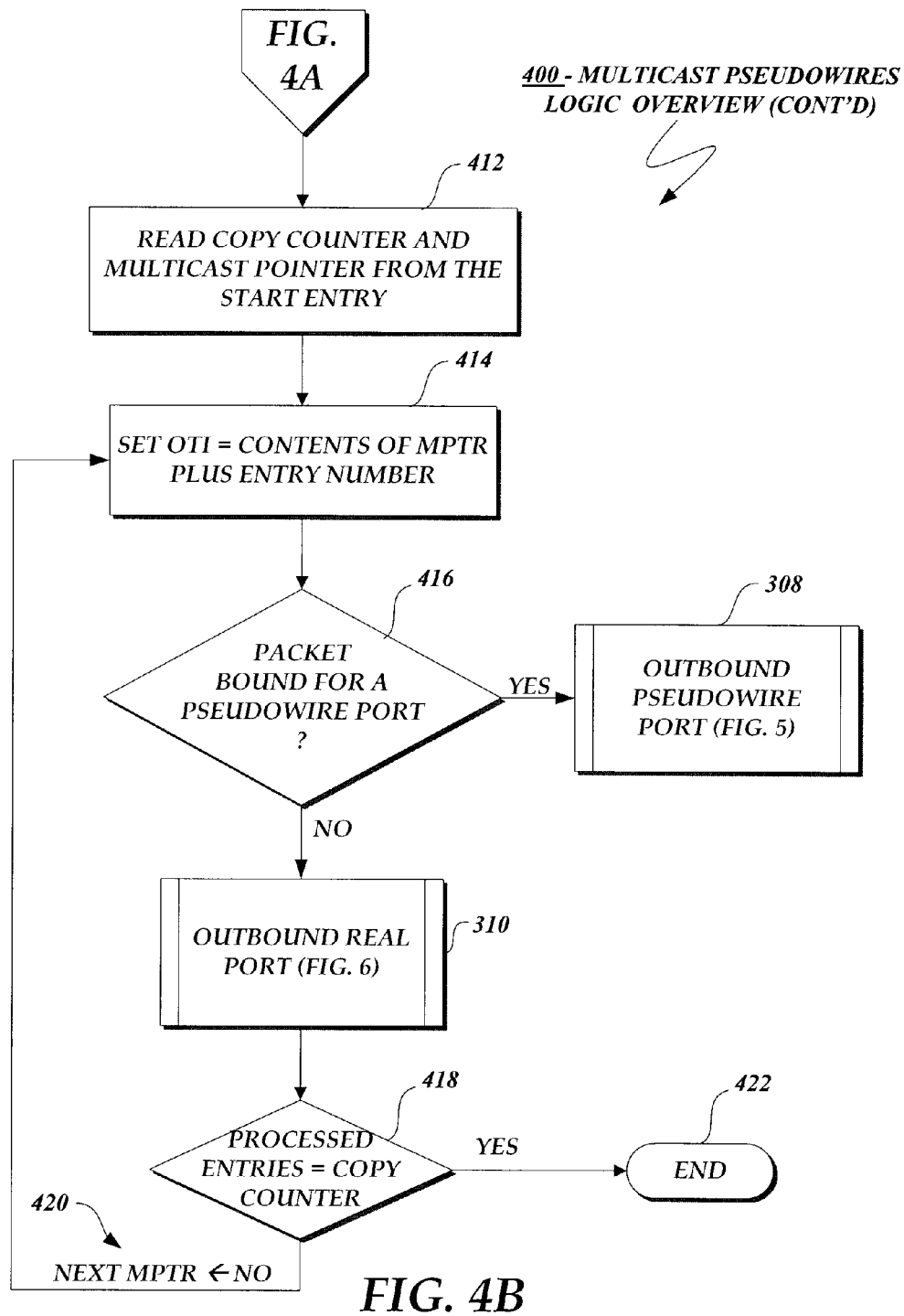

FIG. 4 includes FIG. 4A beginning at process block 402 in which a method 400 for handling packets requiring multicast processing uses the PTI index value 204 as an index to the start entry of the MC list entries 210 that are part of the OT MC RAM 208 described earlier with reference to FIG. 2A. In a typical embodiment, the method 400 obtains the copy counter 406 and a multicast pointer MPTR 408 value to process the list entries LIST ENTRY 1 410A, LIST ENTRY 2 410B as needed until reaching the end of the list at LIST ENTRY N 410C. As shown in further detail in FIG. 4B, at process block 412 the method 400 reads the copy counter and the MPTR from the start entry and at process block 414 the method 400 continues by setting an OTI index value equal to the contents of the MPTR plus the entry number. In this manner the multicast PTI is used to generate the OTI index values, which are then used to determine whether a particular one of the outbound multicast packets is bound for a pseudowire or real port, as shown in decision block 416. Similarly to the unicast packets, packets bound for a pseudowire port are processed in the outbound pseudowire port process 308 described in further detail in FIG. 5, and packets bound for a real port are processed in the outbound real port process 310 described in further detail in FIG. 6. In one embodiment, the method processes the MC list entries until the number of processed entries equals the copy counter. If yes, the method terminates processing at termination block 422; otherwise processing continues at 420 using the next MPTR value to access the next entry in the list.

Figure 5:
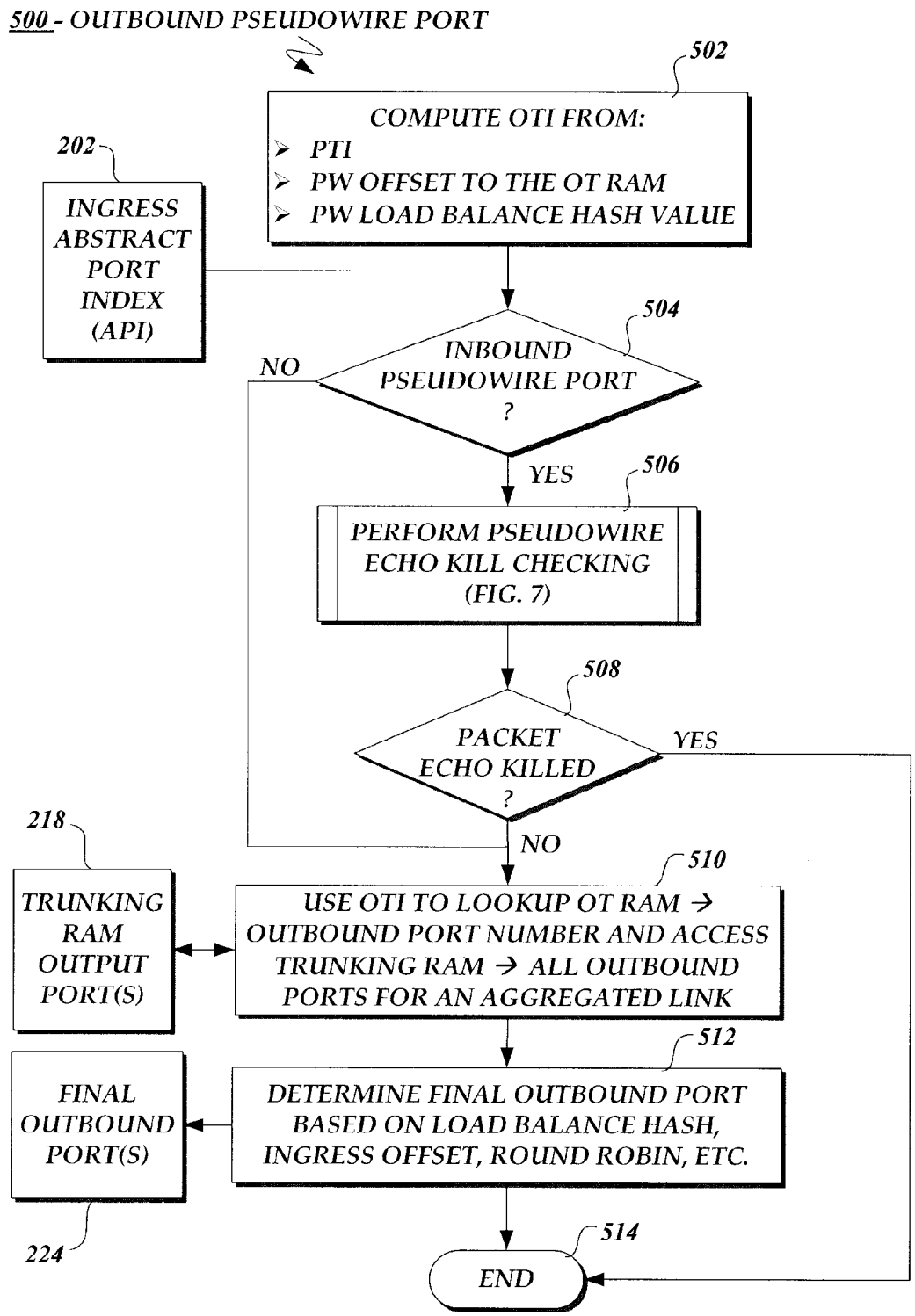

FIG. 5 is the flow diagram illustrating the outbound pseudowire port process 308 referenced in FIGS. 3 and 4B. The method 500 begins at process block 502 in which the OTI index value is computed from the PTI. In a typical embodiment, for a unicast packet, the OTI is computed from the PTI as well as a pseudowire offset value to the OT RAM and a pseudowire load balance hash value. For example, one algorithm that may be employed for unicast packets is as follows:

OTI=PW_OFFSET+PTI[14:0]*8+PW_LB_HASH

Where the PTI value is multiplied by 8 and added to the offset and hash values. For multicast packets, the offset value is typically not used, and the OTI is set to the PTI that was obtained during the MC list processing described in FIG. 4B and added to the pseudowire hash value as follows:

OTI=OTI (from OT_MC_RAM)+PW_LB_HASH

Once the OTI has been computed, the method 500 uses the ingress API value passed from the address filter/packet processing chip to determine at decision block 504 whether the inbound port on which the packet arrived was a pseudowire port or a real port. If it arrived on a pseudowire port, then the packet requires pseudowire echo kill processing 506 since the packet is being transmitted homogeneously through the switch on pseudowire ports. Otherwise the method 500 can skip echo kill processing and branch to the process block 510. Similarly, for those packets that are subject to echo kill processing but survive echo kill processing as determined at decision block 508, the method 500 branches to process block 510. There, the method 500 uses the computed OTI value to lookup the OT RAM entries to obtain an outbound port number, which can be used in turn to access trunking RAM 218 to determine all of the outbound ports for an aggregated link, if any. The method concludes at process block 512, determining the final outbound port 224 based any number of techniques that are known in the art, including but not limited to a load balance hash, an ingress offset, or a round robin process.

Figure 6:
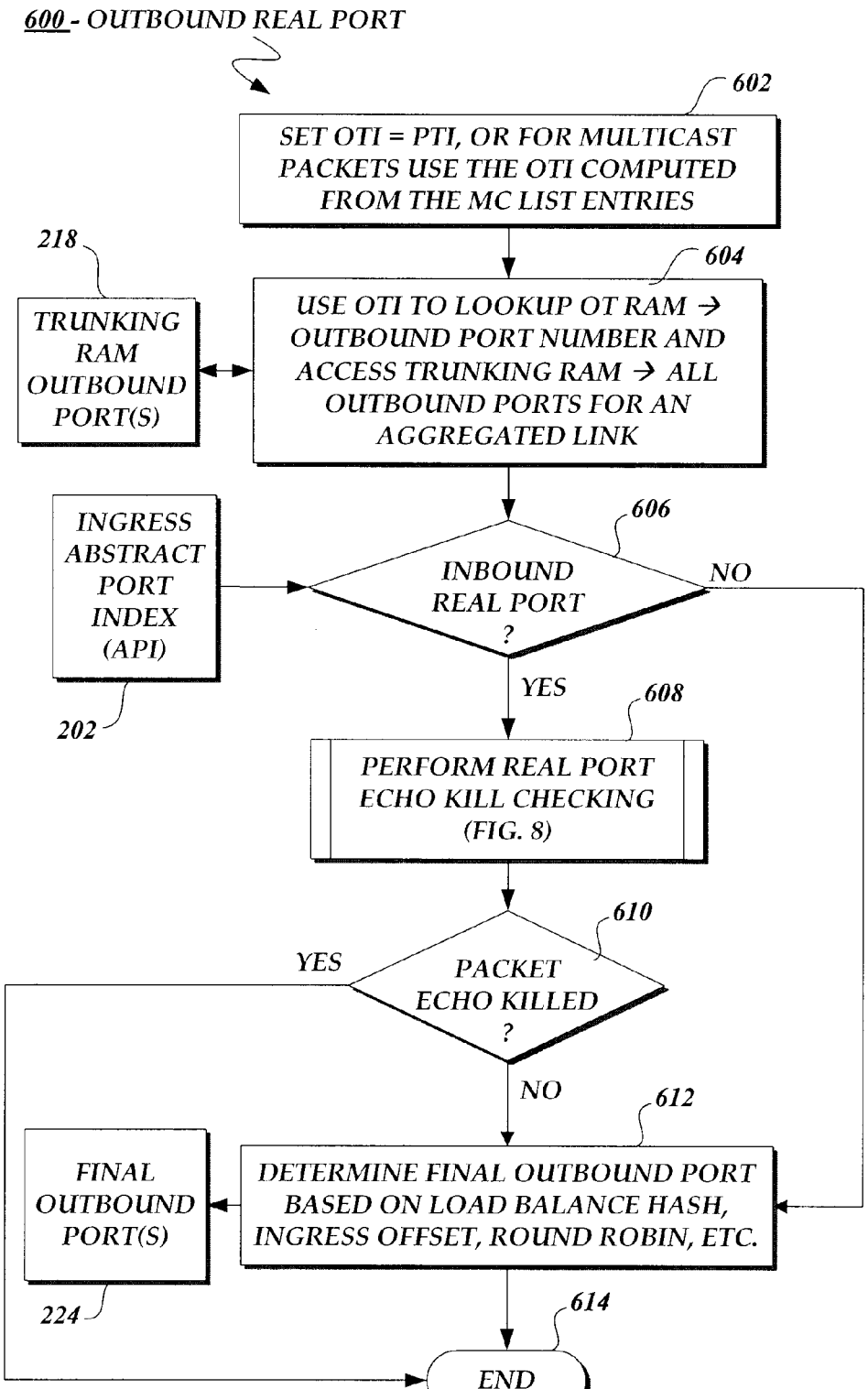

FIG. 6 is the flow diagram illustrating the outbound real port process 310 referenced in FIGS. 3 and 4B. The method 600 begins at process block 602 in which the OTI index value is computed from the PTI. In a typical embodiment, for a unicast packet, the OTI is simply set to the value of the PTI that was initially determined by the address filter/packet processing chip. For multicast packets, however, the OTI is typically set to the value of the OTI that was obtained from the MC list processing described in FIG. 4B.

Once the OTI has been determined, at process block 602, the method 600 uses the determined OTI value to lookup the OT RAM entries to obtain an outbound port number, which can be used in turn to access trunking RAM 218 to determine all of the outbound ports for an aggregated link, if any. The method 600 uses the ingress API value 202 passed from the address filter/packet processing chip to determine at decision block 606 whether the inbound port on which the packet arrived was a pseudowire port or a real port. If it arrived on a real port, then the packet requires real port echo kill processing 608 since the packet is being transmitted homogeneously through the switch on real ports. Otherwise the method 600 can skip echo kill processing and branch to the process block 612. Similarly, for those packets that are subject to echo kill processing but survive echo kill processing as determined at decision block 610, the method 600 branches to process block 612. There, the method 600 concludes at process block 612, determining the final outbound port 224 based any number of techniques that are known in the art, including but not limited to a load balance hash, an ingress offset, or a round robin process.

Figure 7:
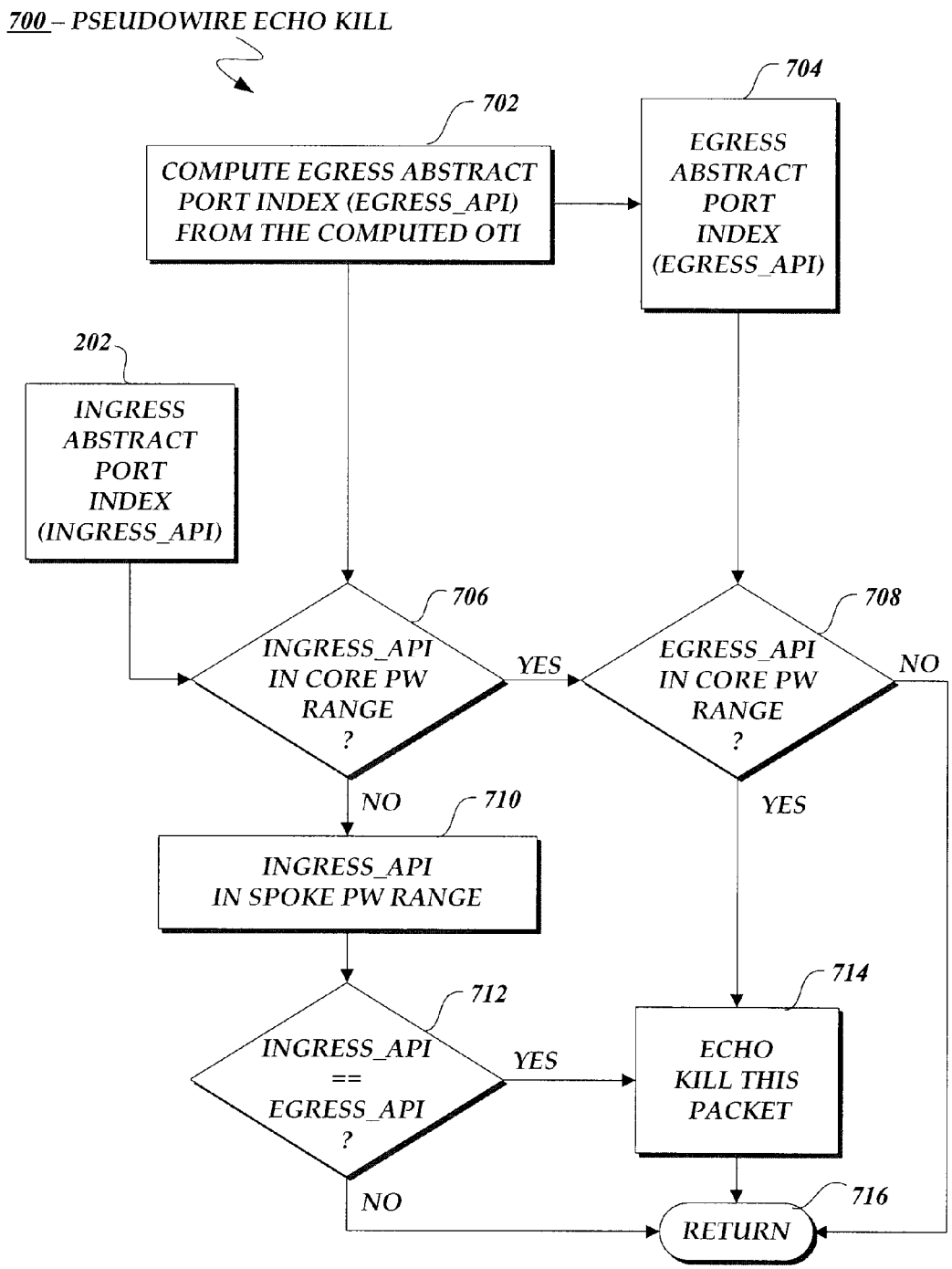

FIG. 7 is the flow diagram illustrating the pseudowire echo kill process 506 first referenced in FIG. 5. The method 700 begins at process block 702 by computing an egress abstract port index 704 (not to be confused with the ingress API 202 determined earlier by the address filter/packet processing chip). In a typical embodiment, the egress API is computed from the already computed OTI value. The method 700 continues at decision block 706 to determine whether the ingress API 202 is within the core pseudowire range of values, where the core range is typically predefined for a particular pseudowire implementation. If so, the method 700 continues at decision block 708 to determine whether the egress API 704 is also within the core pseudowire range. If both the ingress and egress APIs fall within the core pseudowire range, then the method 700 continues at process block 714 to echo kill this packet. If the ingress API was determined at decision block 706 not to fall within the core pseudowire range, then the ingress API is considered to fall within the spoke pseudowire range 710, and the method 700 continues at decision block 712 to determine whether the ingress API 202 is identical to the egress API 704. If so, then the method 700 continues at process block 714 to echo kill this packet. When the packet is not echo killed, the method 700 returns 716 control to the process that initiated the echo kill processing.

Figure 8:
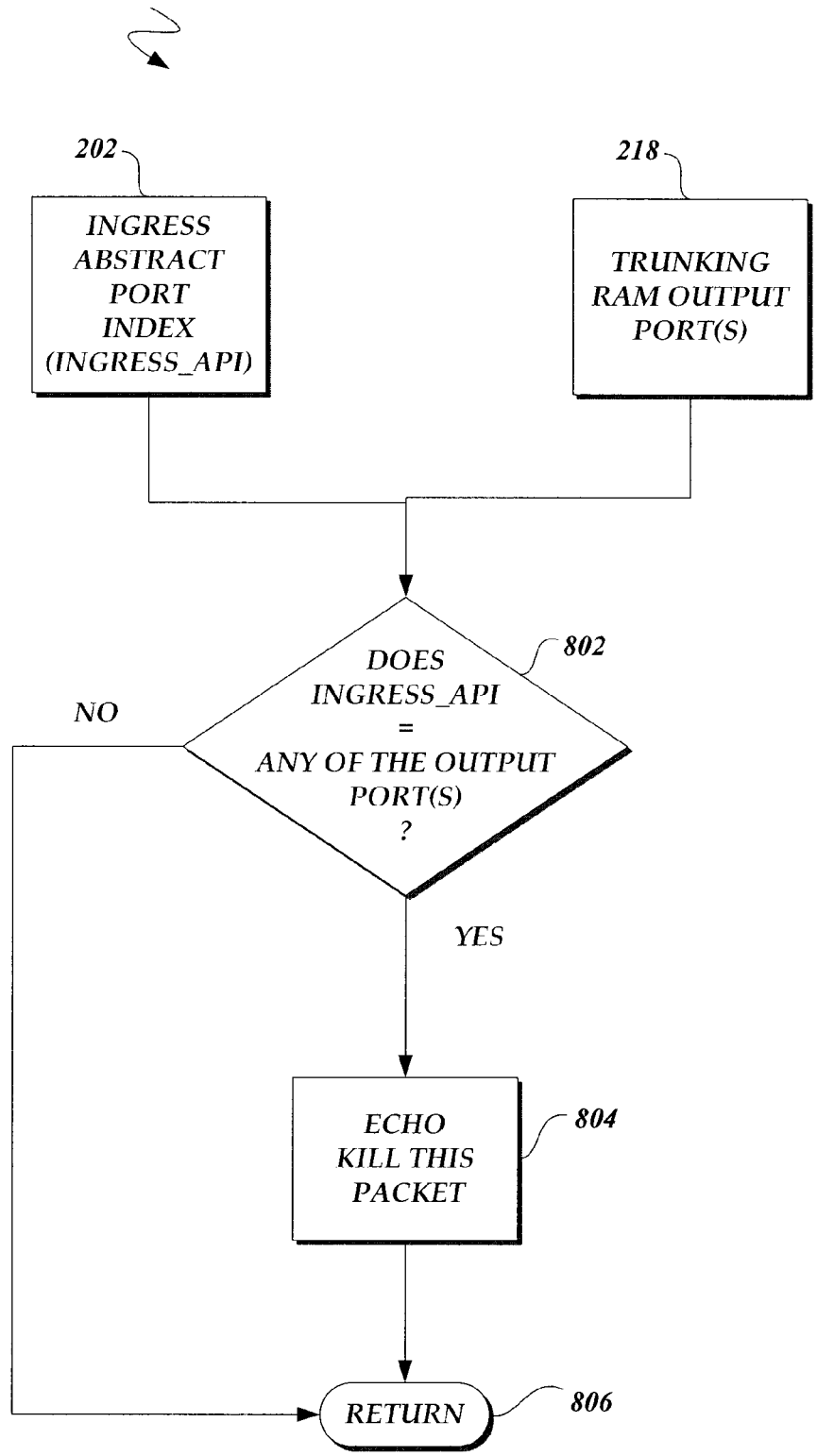

FIG. 8 is the flow diagram illustrating the real port echo kill process 608 first referenced in FIG. 6. Real port echo kill processing is more straightforward than pseudowire echo kill processing, since the ingress API 202 represents a real port, and can be compared against the outbound port candidates accessed in the trunking RAM. The method 800 begins at decision block 802 to compare the ingress API to the trunking RAM outbound ports to determine whether the ingress API matches any of them. If so, then the packet is echo killed at process block 804 and the method 800 returns 806 control to the process that initiated the real port echo kill processing. When the packet is not echo killed, the method 800 simply returns 806 control to the process that initiated the real port echo kill processing.

Figure 9:
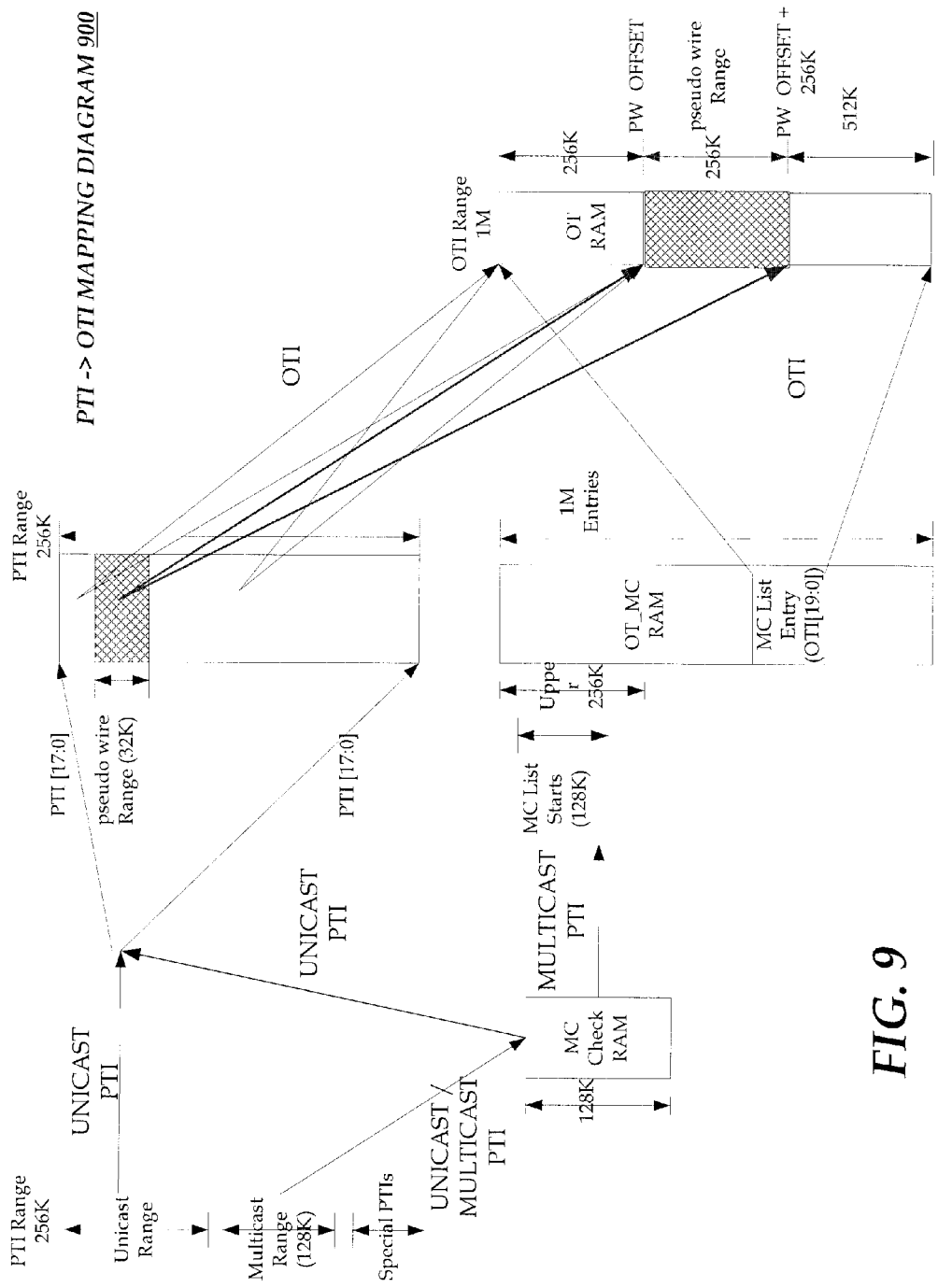
FIG. 9 is a mapping diagram illustrating an example of index conversion for pseudowire processing in accordance with an embodiment of the invention.
Figure 10:
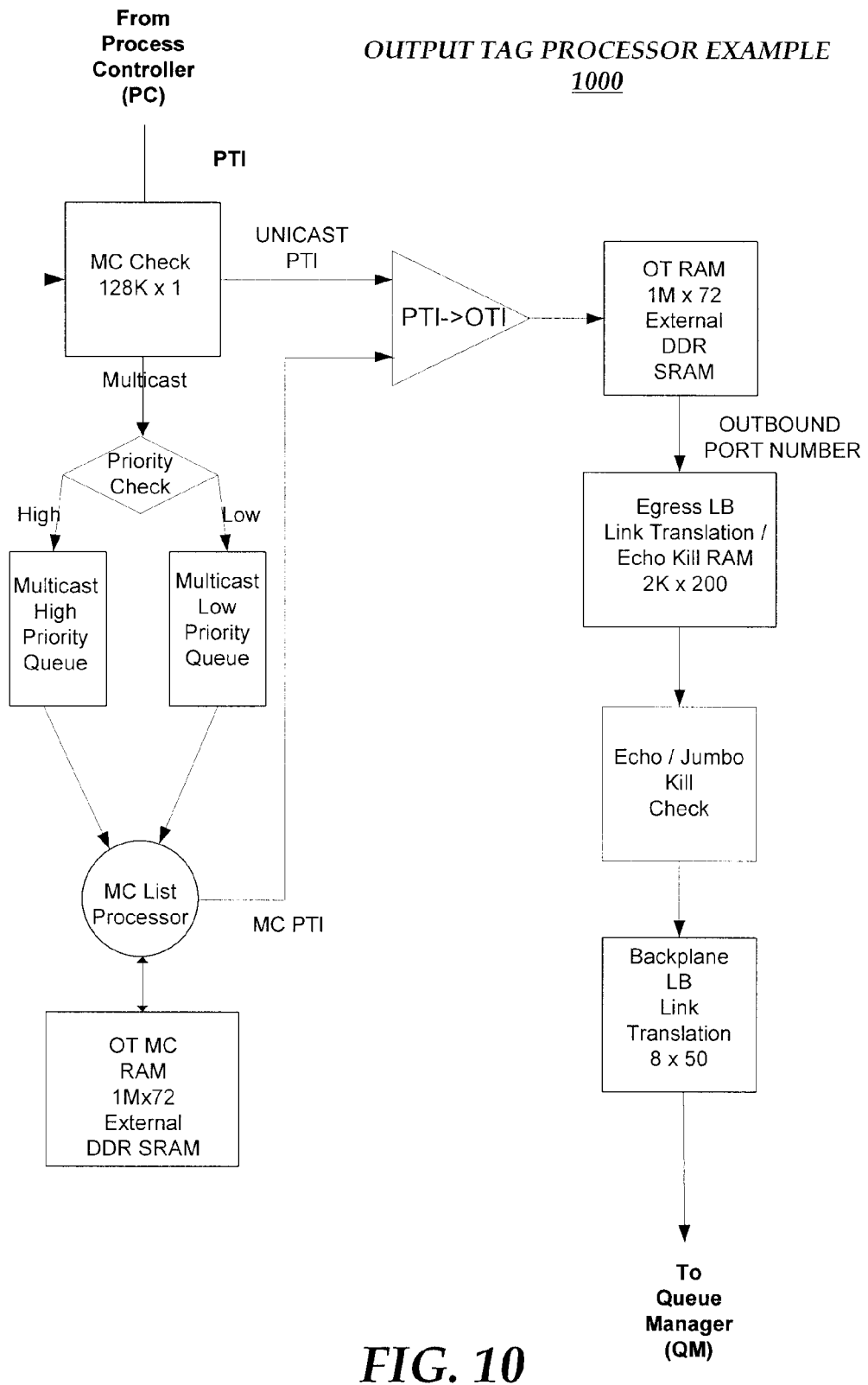
FIG. 10 is a block diagram illustrating an example implementation of an output tag processor incorporated in a packet forwarding device for processing packets transmitted over pseudowires in accordance with an embodiment of the invention.

FIG. 9 illustrates an example of mapping the PTI to an OTI in accordance with an embodiment of the invention. As shown, the PTI range of values span 256K, and is subdivided into a unicast range and a multicast range, and in some cases reserving a portion of the PTI for special processing. In one embodiment, certain PTIs in the multicast range may still be processed as a unicast PTI when an MC CHECK RAM is programmed as unicast for the PTI, even though the PTI falls into the multicast range. The multicast PTIs are translated into multiple OTI values, where the OTI values fall within predefined ranges similar to the PTIs, where a portion of the range is reserved for pseudo wires, and the remaining portion or portions of the range are reserved for real ports. In one embodiment the range of OTI values spans up to 1M values. The unicast PTIs are likewise translated into corresponding OTI values. In one embodiment, the pseudowire range of unicast PTIs spans 32K values, but corresponds to an OTI pseudowire range of 256K values in the OT RAM. FIG. 10 illustrates an example embodiment of an output tag processor formed in accordance with an embodiment of the invention and which may be used together with the example mapping shown in FIG. 9.

Figure 11:
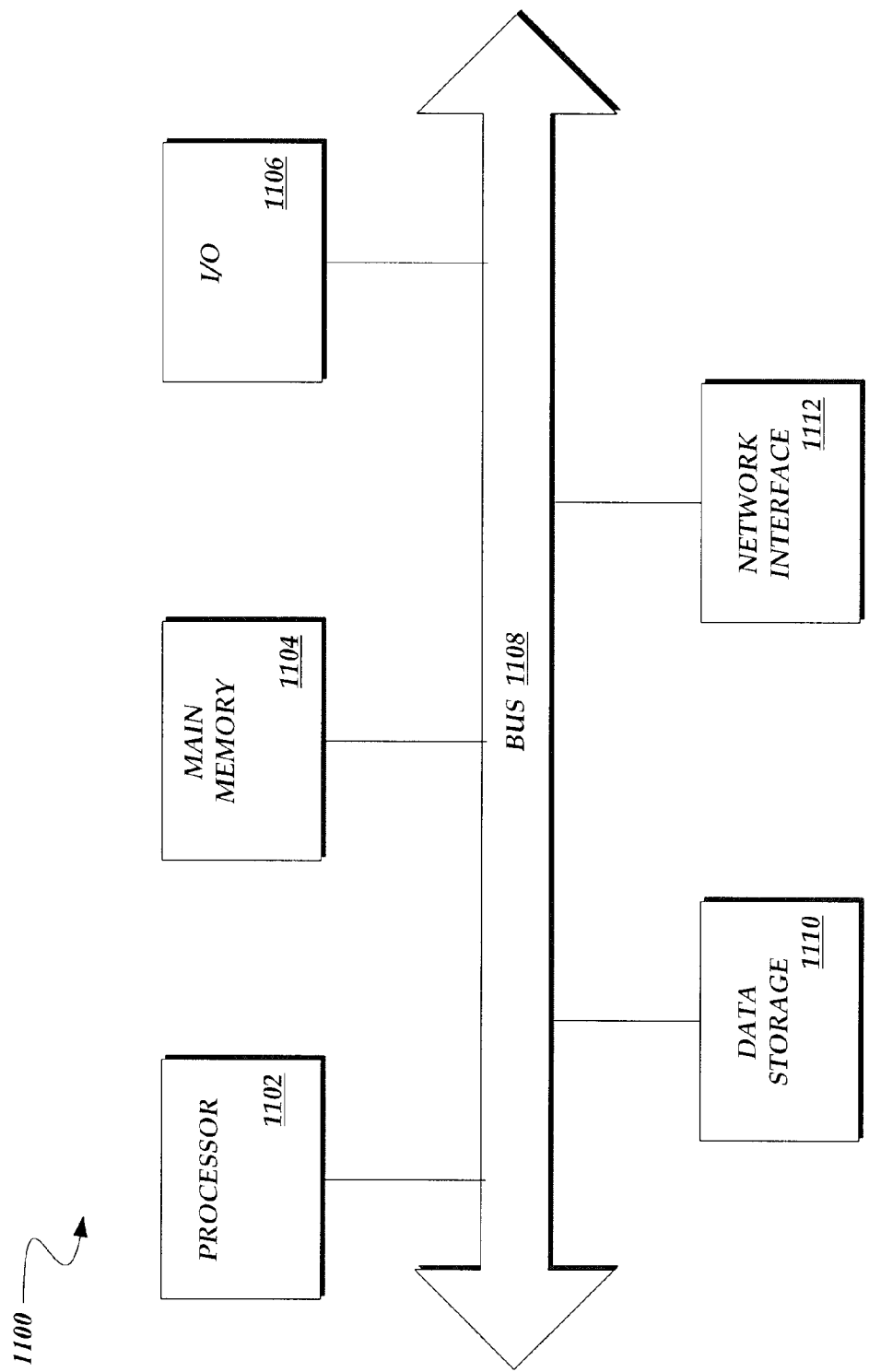
FIG. 11 illustrates one embodiment of a suitable computing environment in which certain aspects of the invention illustrated in FIGS. 1-10 may be practiced.

FIG. 11 illustrates one embodiment of a suitable computing environment in which certain aspects of the invention illustrated in FIGS. 1-10 may be practiced. In one embodiment, the method for a pseudowire processing system 200 may be implemented on a computer system 1100 having components 1101-1106, including a processor 1101, a memory 1102, an Input/Output device 1103, a data storage 1104, and a network interface 1105, coupled to each other via a bus 1108. The components perform their conventional functions known in the art and provide the means for implementing the pseudowire processing system 200. Collectively, these components represent a broad category of hardware systems, including but not limited to general purpose computer systems and specialized packet-forwarding devices.

In one embodiment, the memory component 1102, may include one or more of random access memory (RAM), and nonvolatile storage devices (e.g., magnetic or optical disks) on which are stored instructions and data for use by processor 1101, including the instructions and data that comprise the switch fabric 116 and switch fabric components, including the output tag processor 118, the MC RAM 206, the OT MC RAM 208, the MC list entries 210 in the OT MC RAM, and the OT RAM 216, as well as the PTI to OTI mapping instructions process 212, and any other components of the pseudowire processing system 200.

In one embodiment, the network interface component 1105 may include the real ports, as well as the logical groupings of ports into load shared groups and the virtual pseudowire ports. The data storage component 1104 may also represent the index values used by the address filter/packet processor and output tag processor as well as any routing or bridging tables, and any other storage areas such as packet buffers, etc., used by the packet-forwarding device 100 and switch fabric 116 for forwarding network packets or messages transmitted through real or pseudowire ports.

It is to be appreciated that various components of computer system 1100 may be rearranged, and that certain implementations of the present invention may not require nor include all of the above components. Furthermore, additional components may be included in system 1100, such as additional processors (e.g., a digital signal processor), storage devices, memories, network/communication interfaces, etc.

In the illustrated embodiment of FIG. 11, the method and apparatus for a pseudowire processing system in accordance with one embodiment of the invention as discussed above may be implemented as a series of software routines executed by computer system 1100. The software routines may comprise a plurality or series of instructions, code sequences, configuration information, or other data to be accessed and/or executed by a processing system such as one or more of processor 1101. Initially, the series of instructions, code sequences, configuration information, or other data may be stored on a data storage 1104 and transferred to memory 1102 via bus 1108. It is to be appreciated that the series of instructions, code sequences, configuration information, or other data can be stored a data storage 604 using any conventional computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a propagated data signal received from a remote storage device, such as a server on a network, via a network/communication interface 1105. The instructions, code sequences, configuration information, or other data may be copied from the data storage 1104, such as mass storage, or from the propagated data signal into a memory 1101 and accessed and executed by processor 1102.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for a method and apparatus for a pseudowire processing system. From the foregoing description, those skilled in the art will recognize that many other variations of the present invention are possible. In particular, while the present invention has been described as being implemented in a network comprising one or more packet-forwarding devices 108 in a packet switched network, some of the logic may be distributed in other components of a network or internetwork application. Thus, the present invention is not limited by the details described. Instead, the present invention can be practiced with modifications and alterations within the spirit and scope of the appended claims.

What is claimed is:

1. A computer-implemented method for pseudowire processing in a packet forwarding device, the method comprising:
   determining whether an inbound port through which a packet has been transmitted to a packet forwarding device is a real port or a pseudowire port, wherein determining is performed in conjunction with inbound port information stored in at least one of a forwarding data base and an inbound label map of the packet forwarding device;
   encoding the inbound port through which the packet is transmitted in a value of a first index having a predefined range of values representing real ports and pseudowire ports, the value based on whether the inbound port is determined to be the real port or the pseudowire port in conjunction with the stored inbound port information;
   encoding an outbound port through which the packet will be transmitted in a value of a second index having a predefined range of values representing real ports and pseudowire ports; and
   performing outbound packet processing for the packet in a switch fabric of the packet forwarding device based on determining, within their respective predefined range of values, where the first index value and the second index value fall, including:
   determining whether the packet is transmitted through the packet forwarding device homogeneously, wherein the respective predefined ranges within which the first and second index values fall both represent real ports or both represent pseudowire ports, or heterogeneously, wherein the respective predefined ranges within which the first and second index values fall represent different types of ports, one representing a real port and the other representing a pseudowire port;
   performing echo kill processing for packets transmitted homogenously; and
   bypassing echo kill processing for packets transmitted heterogeneously.

2. The computer-implemented method of claim 1, wherein the value of the second index having the range of values representing real ports and pseudowire ports further indicates whether the packet requires multicast processing or unicast processing, wherein multicast processing includes:
   accessing a list of multicast entries corresponding to the value of the second index, the multicast entries being accessed via a multicast pointer and a copy counter; and
   generating, for each entry in the list of multicast entries corresponding to the value of the second index, a new value for the second index; and
   further performing outbound packet processing for the packet in the switch fabric of the packet forwarding device based on the new value of the second index, the new value of the second index falling within the predefined range of values for the second index representing real ports and pseudowire ports.

3. The computer-implemented method of claim 1, further comprising:
   mapping the value of the second index to a value of a third index, wherein values of the third index correspond to outbound port entries stored on the packet forwarding device, the entries for obtaining outbound port numbers;
   accessing the outbound port entry to which the value of the third index corresponds; and
   obtaining an outbound port number to be used when transmitting the packet to an outbound port based on the outbound port entry to which the value of the third index corresponds.

4. A packet-forwarding device for supporting pseudowire processing, the device comprising:
   real ports;
   pseudowire ports;
   inbound port information stored on the packet forwarding device for determining whether an inbound packet is transmitted on one of the real ports or pseudowire ports;

outbound port information stored on the packet forwarding device for determining whether an outbound packet is transmitted on one of the real ports or the pseudowire ports; and a processor in which to:
encode the inbound port information into an abstract port index having a predefined range of values representing the real ports and pseudowire ports;
encode the outbound port information into an egress port tag index having a predefined range of values representing the real ports and pseudowire ports;
perform outbound packet processing in accordance with the abstract port index and the egress port tag index, including:
performing echo kill processing of packets that are transmitted through the packet forwarding device homogenously, wherein the respective predefined ranges within which the abstract port and egress port tag index values fall both represent real ports or both represent pseudowire ports; and
bypassing echo kill processing of packets that are transmitted through the packet forwarding device heterogeneously, wherein the respective predefined ranges within which the abstract port and egress port tag index values fall represent different types of ports, one representing a real port and the other representing a pseudowire port.

5. The packet forwarding device of claim 4, wherein the value of the egress port tag index having the range of values representing real ports and pseudowire ports further indicates whether the packet requires multicast processing or unicast processing, wherein the processor further:
accesses a list of multicast entries corresponding to the value of the egress port tag index, the multicast entries being accessed via a multicast pointer and a copy counter; and
generates, for each entry in the list of multicast entries corresponding to the value of the egress port tag index, a new value for the egress port tag index; and
performs outbound packet processing based on the new value of the egress port tag index, the new value of the egress port tag index falling within the predefined range of values for the egress port tag index representing real ports and pseudowire ports.

* * * * *